United States Patent [19]
Breese et al.

[11] Patent Number: 6,006,218
[45] Date of Patent: Dec. 21, 1999

[54] METHODS AND APPARATUS FOR RETRIEVING AND/OR PROCESSING RETRIEVED INFORMATION AS A FUNCTION OF A USER'S ESTIMATED KNOWLEDGE

[75] Inventors: John S. Breese, Mercer Island; David E. Heckerman, Bellevue; Eric Horvitz, Kirkland; Carl Kadie, Bellevue; Keiji Kanazawa, Seattle, all of Wash.

[73] Assignee: Microsoft, Redmond, Wash.

[21] Appl. No.: 08/807,566

[22] Filed: Feb. 28, 1997

[51] Int. Cl.[6] .................................................. G06F 17/30
[52] U.S. Cl. ......................................... 707/3; 707/5
[58] Field of Search .................................. 707/3, 4, 5, 6, 707/10, 2

[56] References Cited

U.S. PATENT DOCUMENTS

| | | | |
|---|---|---|---|
| 5,583,763 | 12/1996 | Atcheson et al. | 364/551.01 |
| 5,642,502 | 6/1997 | Driscoll | 395/605 |
| 5,706,493 | 1/1998 | Sheppard, II | 395/601 |
| 5,710,884 | 1/1998 | Dedrick | 395/200.47 |
| 5,717,923 | 2/1998 | Dedrick | 395/613 |
| 5,724,567 | 3/1998 | Rose et al. | 395/602 |
| 5,740,017 | 4/1998 | Heckerman et al. | 395/61 |
| 5,790,426 | 8/1998 | Robinson | 364/554 |
| 5,790,935 | 8/1998 | Payton | 455/5.1 |
| 5,794,237 | 8/1998 | Gore, Jr. | 707/5 |
| 5,799,298 | 8/1998 | Bingham et al. | 707/1 |
| 5,819,255 | 10/1998 | Celis et al. | 707/2 |
| 5,826,260 | 10/1998 | Byrd, Jr. et al. | 707/5 |
| 5,867,799 | 2/1999 | Lang et al. | 707/1 |
| 5,870,740 | 2/1999 | Rose et al. | 707/5 |
| 5,873,081 | 2/1999 | Harel | 707/3 |

OTHER PUBLICATIONS

Balabanovic et al. "Fab: Content–based, collaborative recommendation" Communications of the ACM, pp 66–72.

Rus et al. "Customizing Information Capture and Access" ACM Transactions on Information Systems, vol. 15, No. 1, pp. 67–101, Jan. 1997.

Lam et al. "Detection of Shifts in User Interests for Personalized Information Filtering" SIGIR'96, ACM Website, pp. 327–335, Aug. 1996.

*Primary Examiner*—Paul V. Kulik
*Assistant Examiner*—Michael J. Wallace, Jr.
*Attorney, Agent, or Firm*—Michaelson & Wallace; Peter L. Michaelson; Michael P. Straub

[57] ABSTRACT

Information retrieval methods and apparatus which involve: 1) the generation of estimates regarding the probability that items included in search results are already known to the user and 2) the use of such knowledge probability estimates to influence the ranking of search results, are described. By discounting the ranking, or adjusting ranking values generated by a known search engine as a function of the knowledge probability estimates, the present invention reduces or eliminates the risk of locating known information near the top of a list of search results. This is advantageous since known information is generally of little interest to a user. In various embodiments the popularity of an item is used to estimate the probability that the item is already known to a user. In addition, in various embodiments one or more user controllable parameters are used in the generation of the knowledge probability estimates and/or the ranking of the search results to give the user an opportunity to have the ranking of the search results accurately reflect the user's knowledge. The present invention is particularly well suited to collaborative filtering based search systems. This is because collaborative filters make recommendations to a user based on historical information relating to, e.g., the popularity of items being considered for recommendation. This same popularity information can be used to estimate a users knowledge of a database item. Such items may include television shows, music, Internet sites, etc.

47 Claims, 12 Drawing Sheets

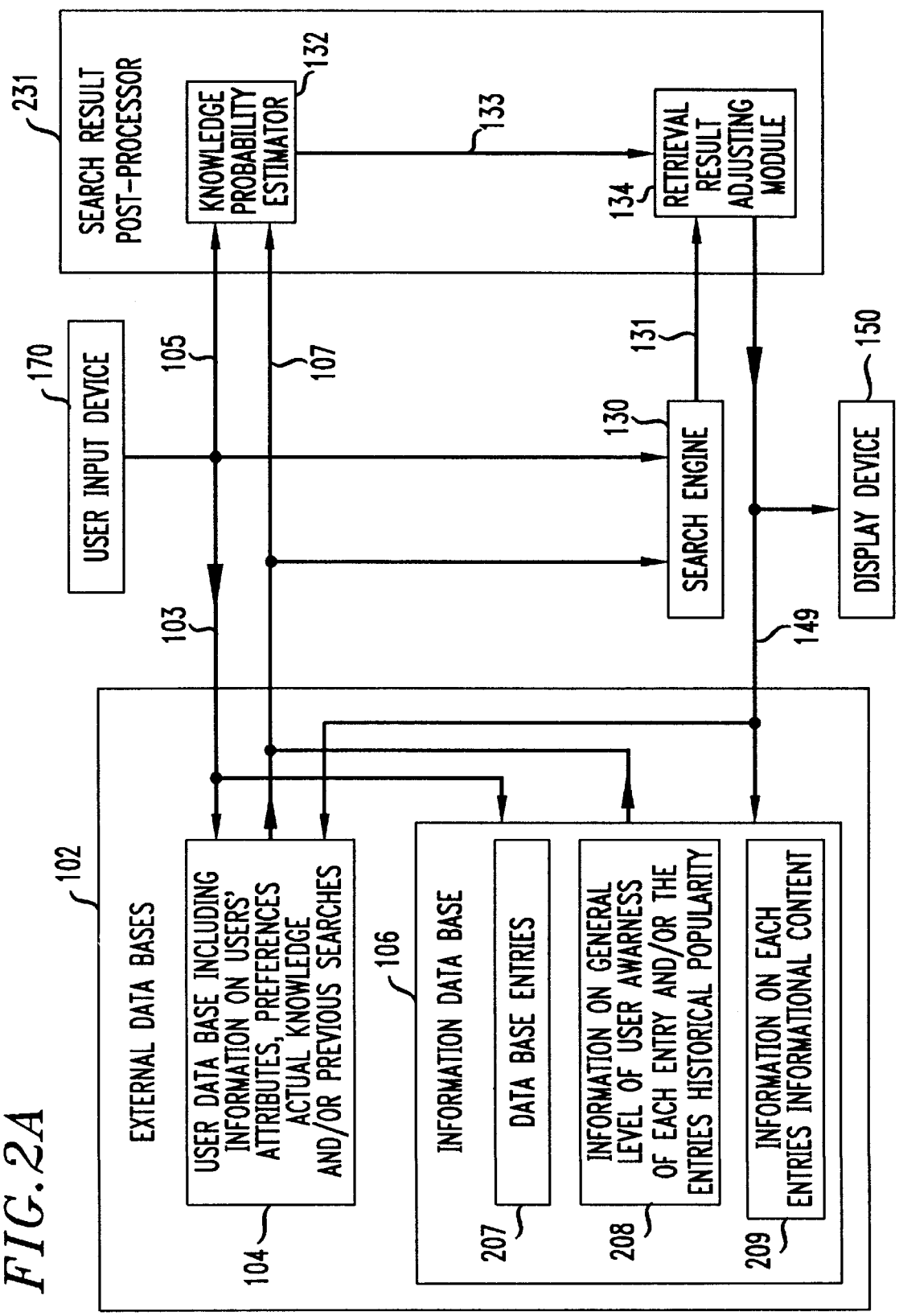

FIG.6
600

| 630 TV SHOW | 632 # OF POLLED INDIVIDUALS VOTING ON AND LIKING TV SHOW | 633 # OF POLLED INDIVIDUALS VOTING ON MOST POPULAR SHOW | 634 POPULARITY RANK | 636 INFORMATION ON CONTEM OF ENTRY |
|---|---|---|---|---|
| SEINFELD | 75 | 105 | 90 | SITUATION COMEDY |
| MATLOCK | 35 | 105 | 60 | DETECTIVE ATTORNEY DRAMA |
| THREE STOOGES | 80 | 105 | 75 | PHYSICAL COMEDY |
| SISTERS | 30 | 105 | 25 | SITUATION COMEDY |
| POWER RANGERS | 20 | 105 | 65 | CHILDREN'S SUPER HERO ACTION SHOW |

612 – SEINFELD
614 – MATLOCK
616 – THREE STOOGES
618 – SISTERS
620 – POWER RANGERS

METHODS AND APPARATUS FOR RETRIEVING AND/OR PROCESSING RETRIEVED INFORMATION AS A FUNCTION OF A USER'S ESTIMATED KNOWLEDGE

FIELD OF THE INVENTION

The present invention is directed to information retrieval and, more particularly, to methods and apparatus for retrieving information and/or processing retrieved information as a function of a user's estimated knowledge.

BACKGROUND OF THE INVENTION

Frequently people attempting to retrieve information from, e.g., an information database, are confronted with the problem of being provided more information than they need, want and/or are capable of reviewing in a reasonable amount of time. This problem is sometimes referred to as "information overload".

Examples of searches which can result in information overload include, e.g., Internet searches for sites which may include information about a particular topic of interest. Database searches for television shows, songs, or movies that a user might be interested in are additional examples of searches that may result in an excess of information.

Information overload is the result of the ever increasing size of modern databases and the difficulty associated with searching and efficiently retrieving desired information from a database. Desired information may include, e.g., the information that will be the most useful, relevant and/or interesting to a particular individual database user. Generally, information that is already known to the user, although potentially responsive to an information retrieval request, is of little value because it presents the user with no information that is new to the user. Accordingly, known information that is included in a list of search results may be thought of as unwanted "noise" which merely distracts the user from more useful material and/or wastes the user's time.

Various known information retrieval systems attempt to avoid the problem of information overload by performing a ranking, e.g., result prioritization, operation as part of an information retrieval operation. In such systems retrieved information is often ranked in some order which is intended to approximate how useful, interesting, and/or responsive the information is likely to be to the system user. Unfortunately, ranking of search results fails to address the noise problem resulting from the inclusion of known information in the search results.

In order to partially address the problem of including known information in search results, some information retrieval systems conduct searches in a manner that avoids including information in the search results that the user has already explicitly indicated are known to the user. Unfortunately, this approach frequently has little impact on the search results since it is difficult and often impractical for a user to identify, prior to a search, all or most of the database entries which are known to the user.

While the use of ranking of search results and the elimination of items which a user has explicitly indicated as being known to the user has helped to avoid or reduce the problem of information overload to some extent, people searching databases for information continue to be confronted with large amounts of data that can be time consuming to review. Furthermore, as databases continue to grow in size, the problem of a user being provided too much information to review in a reasonable amount of time is becoming an ever increasing problem.

Accordingly, there is a need for methods and apparatus which can be used to improve the results of ranking operations performed by existing information retrieval systems. In addition, there is a need for new systems which are more effective at selecting and/or prioritizing information to be presented to a user in response to an information retrieval request, e.g., a database search request. Furthermore, it is desirable that such methods and apparatus include features for taking into consideration a particular user's existing knowledge to reduce the risk of providing, or assigning a high ranking to, information which is already known to a user and which is therefor of little value.

It is also desirable that such methods and apparatus be capable of being used with a wide variety of existing information retrieval systems and search engines without requiring modifications thereto.

SUMMARY OF THE PRESENT INVENTION

The present invention is directed to methods and apparatus for improving existing information retrieval systems as well as to providing new improved information retrieval systems.

In accordance with the present invention, estimates of the probability that items being searched are already known to a user or items listed in search results are known to a user, are generated. The generated knowledge probability estimates are then used for ranking or re-ranking search results. Thus, various methods and apparatus of the present invention are directed to adjusting, e.g., correcting, the results of various search engines, such as collaborative filters. This is done by factoring into the search results and ranking thereof, a consideration of the probability that the user already knows about certain data items.

Thus, in accordance with the present invention, knowledge probability estimates are used to effectively discount the value of an item to a user, e.g., as represented by the items ranking in a set of search results, based on the likelihood that the item is already known to the user. Because knowledge probability estimates are used in accordance with the present invention to adjust a list of search results, the probability that a user will be presented with information that the user is already aware of, e.g., near the top of a list of search results, is reduced as compared to known systems. In addition, when the number of search results is limited to a fixed number, the knowledge probability estimates are considered when making decisions regarding which items in the list of search results to discard in an attempt to insure that the user is presented with information that is both new and useful.

In order to generate the knowledge probability estimates, factors which may be considered include: the popularity of the individual data items being searched, a user's experience in the area being searched, the overall salience of an item, the amount of time the item has been accessible by the public, e.g., on a server, demographic information about the user as well as other factors, e.g., user controllable parameters.

The methods and apparatus of the present invention can be used in conjunction with a wide range of conventional information retrieval systems, e.g., search engines, including collaborative filters.

Collaborative filters generate, using historical information on a large number of individuals preferences and information on the attributes and preferences of a particular user, a list of recommendations sorted by their estimated value to the user. The historical information relating to an item's popularity used to perform a collaborative filtering operation may also be used to generate knowledge probability estimates in accordance with the present invention. For this reason, collaborative filters are particularly well suited for use with the present invention.

The list of recommendations generated using a collaborative filter can be, e.g., a list of televisions shows, songs, World Wide Web sites, etc. that may be of interest to the user. In accordance with the present invention, the value of individual recommendations, in a list of recommendations, is adjusted, e.g., corrected, based on the estimated probability that a particular item being recommended to the user is already known to the user. By performing a re-ranking operation in this manner, the present invention achieves a more meaningful ranking of recommendations than is achieved using prior art approaches. Furthermore, the noise problem and the risk of information overload associated with including known items in the results of an information retrieval request, such as a collaborative filtering operation, is reduced.

The present invention can be used when making recommendations to a user, e.g., in response to a user initiated information request or, after monitoring a user's actions for a period of time. The monitored actions may involve, e.g., the user's accessing of Internet sites. In either case, the present invention provides an improved method of making recommendations or suggestions to the user regarding other Internet sites or data items which might be unknown but interesting to the user.

Numerous additional features and aspects of the methods and apparatus of the present invention are set forth in the detailed description that follows.

BRIEF DESCRIPTION OF THE DRAWINGS

FIG. 2A illustrates the data flow between various components of the information retrieval system of FIG. 1 when the system of FIG. 1 is configured in accordance with a first exemplary embodiment of the present invention.

FIG. 6 illustrates an information database implemented in accordance with an exemplary embodiment of the present invention.

DETAILED DESCRIPTION

As discussed above, the present invention is directed to improved information retrieval methods and apparatus which take into consideration a user's existing knowledge in an attempt to eliminate or assign lower importance to information which is probably already known to the user. Various apparatus and methods of the present invention are capable of prioritizing search results and/or limiting the amount of information included in a set of search results based on, e.g., an estimate of a user's knowledge. An apparatus implemented in accordance with the present invention will now be discussed with reference to FIG. 1.

Figure 1:
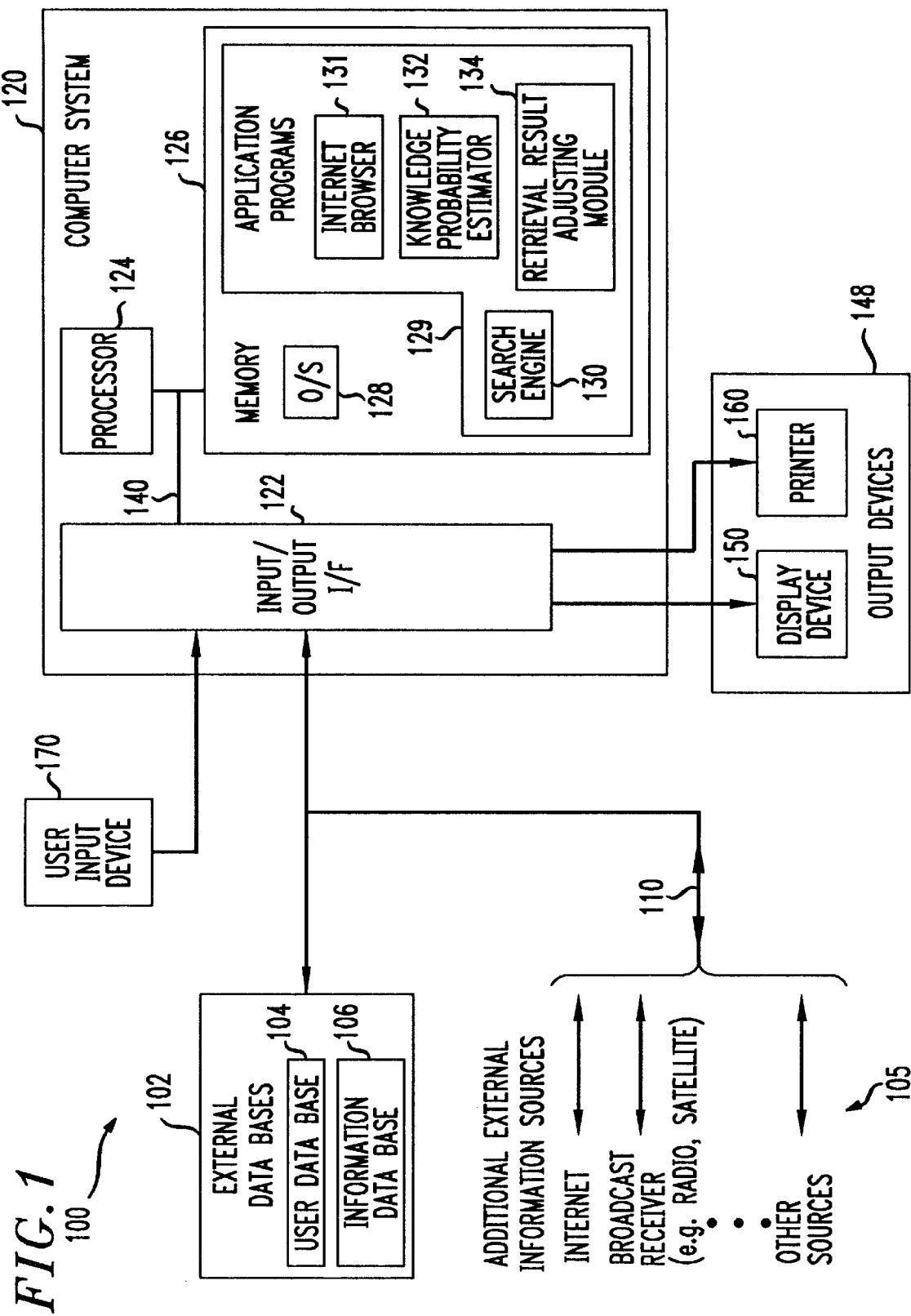
FIG. 1 illustrates an information retrieval system implemented in accordance with an exemplary embodiment of the present invention.

Referring now to FIG. 1, there is illustrated a high-level block diagram of a system 100 that can be used to implement one or more different embodiments of the present invention. As illustrated, the system includes a computer system 120 which itself comprises an input/output interface 122, a processor 124, and a memory 126 all conventionally interconnected by bus 140. Memory 126, which generally includes different modalities, all of which are not specifically shown for simplicity, may be implemented using random access memory (RAM), hard disk storage and/or other removable media devices, such as CD-ROM drives, which are capable of reading information stored on a computer-readable medium such as a CD-ROM. In accordance with the present invention the memory 126 stores an operating system (O/S) 128 and a variety of application programs 129. The application programs include an Internet browser 131, a search engine 130, a knowledge probability estimator module 132, and a retrieval result adjusting module 134.

The search engine 130 may be any one of a plurality of known database or information retrieval search engines. In one embodiment, the search engine 130 is implemented as a collaborative filter. One suitable collaborative filter is described in pending U.S. patent application Ser. No. 08/602,238 titled "Collaborative Filtering Utilizing a Belief Network", filed Feb. 16, 1996, which is hereby expressly incorporated by reference. O/S 128 may illustratively constitute the WINDOWS NT operating system presently available from the Microsoft Corporation of Redmond, Wash. (WINDOWS NT is a registered trademark of the Microsoft Corporation).

The computer system 120 is coupled to a plurality of data sources via the input/output interface 122 and a bi-directional bus 110. The data sources include a user input device 170 such as a keyboard and/or mouse, a plurality of external databases 102, and a plurality of additional external information sources. The additional information sources, of which only a few are specifically shown, illustratively include, e.g., an Internet connection and a broadcast receiver such as a television or satellite receiver. Inasmuch as the present invention will function with stored information, e.g., data, regardless of its source, the particular modality through which such data is physically provided to the computer system 120 is immaterial.

The external databases 102 include a user database 104 and an information database 106. The content of these databases will be discussed in detail with regard to FIGS. 5 and 6, respectively. While the user database 104 and the information database 106 are illustrated as being external to the computer system 120, it is to be understood that these databases could be implemented as part of the memory 126 of the computer system 120. In one embodiment, the Internet browser application stores information on Internet sites visited by the user as well as information on the frequency of visits to Internet sites, by one or more users, in the user database 104.

In addition to coupling the computer system 120 to a plurality of external data sources, the input/output interface 122 electrically connects and interfaces the computer system 120 to a plurality of output devices 148. The output devices include, e.g., a display 150, such as a conventional color monitor, and printer 160, such as a conventional laser printer or other well-known printer.

A user can invoke an application program or software module implementing the present invention through appropriate commands entered via device 170 and/or in response to selecting a program icon appearing on display 150 that represents the application.

Figure 5:
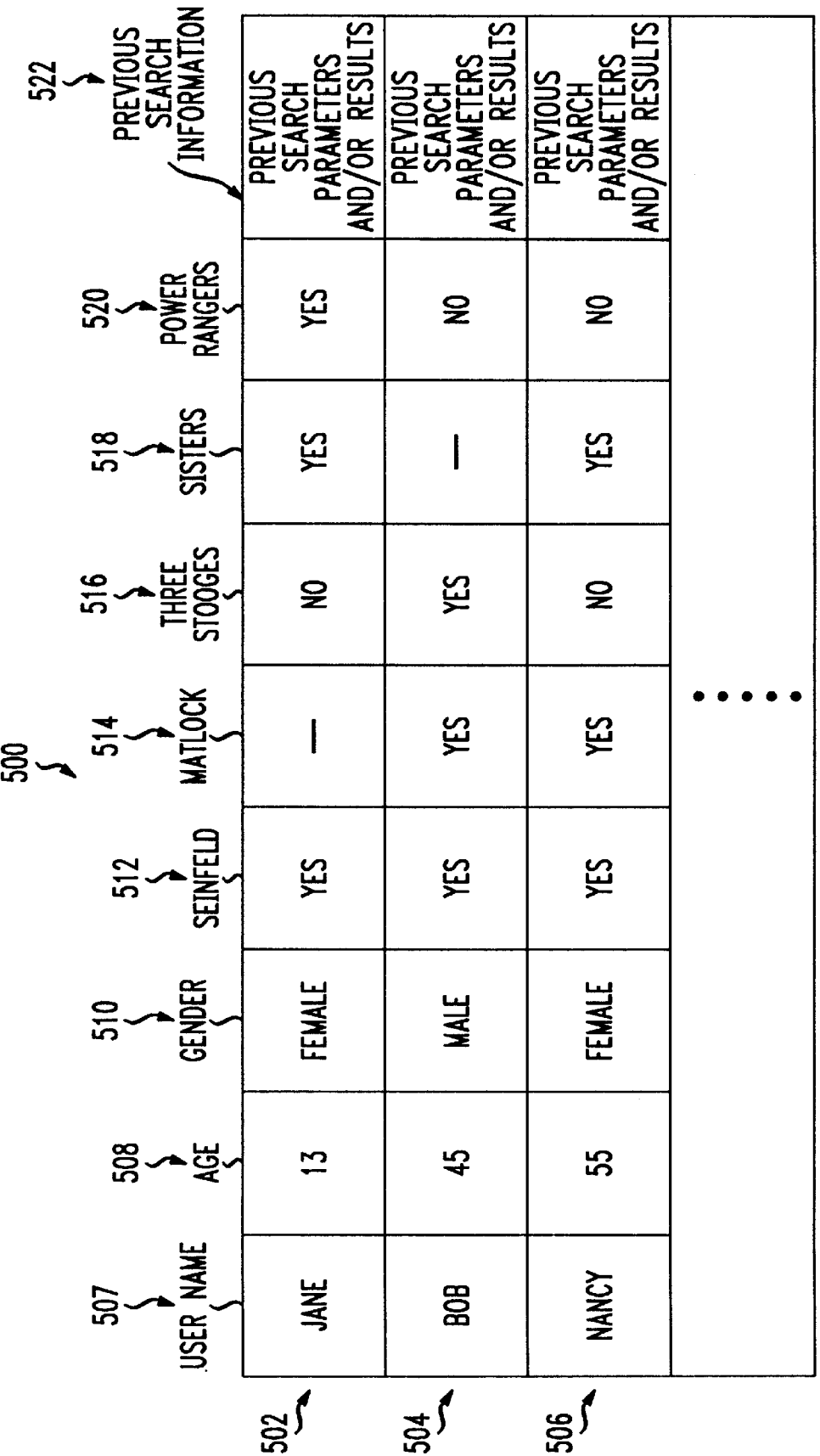
FIG. 5 illustrates a user database implemented in accordance with an exemplary embodiment of the present invention.

The user database 104 and the information database 106 will now be described with reference to FIGS. 5 and 6. FIG. 5 illustrates an exemplary user database generally indicated by the reference number 500. The user database 500 may be used as the user database 104 of the FIG. 2A embodiment. The user database comprises sets of information entries 502, 504, 506, sometimes referred to as cases. Each set of information entries includes a unique identifier, e.g., a name 507 or a randomly assigned unique number, and optionally, information about the user's attributes, e.g., age 508 and gender 510. In addition, each case may include information on the user's actual knowledge, and information 522 about previously conducted searches and/or previous user actions, e.g., such as Internet site access operations in the case of an Internet browser embodiment. The information on the user's actual knowledge may include questionnaire results, or other data indicating whether the user knew about and liked or disliked various items, e.g., television shows, included as entries in the information database 106. Consider for example, case 502 for the user having the name Jane. The information in the user database 500 for case 502 indicates that Jane is age 13, female and that she knows about and likes the television shows Seinfeld, Sisters and Power Rangers, knows about and dislikes the television show Three Stooges and does not know about the television show Matlock.

While the contents of three cases 502, 504, 506 are illustrated in FIG. 5, it is to be understood that the user database may include information for any number of cases wherein each case would correspond to a different individual or other uniquely identified user.

Referring now to FIG. 6, there is illustrated an exemplary information database 600 which may be used as the information database 106. The information database 600 comprises a list 630 of database entries 612, 614, 616, 618, 620 which, in this example, are the names of TV shows. In addition, for each of the listed database entries additional information on, e.g., the general level of user awareness of the show, the entries historical popularity, and/or the television shows information content is included in the database 600.

Columns 632 and 633 show the storage of information relating to the general level of user awareness of the television shows 630. For each of the television shows 612, 614, 616, 618, 620 information on the number of polled users who voted on and indicated that they knew about and liked the television show is stored, e.g., in column 632, as is information on the total number of polled people who voted on, i.e., indicated that they new about and liked or disliked, the most popular television show listed in the database 600.

Column 634 shows the storage of information relating to the historical popularity of the database entries. In this exemplary embodiment, the information listed in column 634 represents the rank of the television shows 612, 614, 616, 618, 620, e.g., on a list of the top 100 television shows with the number in column 634 indicating the shows ranking out of 100 with the higher numbers indicating the more popular television shows.

Column 636 includes information on the content, e.g., subject matter, of the television shows listed in column 630. For example, column 636 indicates that the television show Seinfeld 612 is a situation comedy, that the television show Matlock 614 is a detective/attorney drama, that the television show Three Stooges 616 is a physical comedy, that the television show Sisters 618 is a situation comedy and that the television show Power Rangers 620 is a children's super hero action show.

While all of the information stored in the information database 600 may be used in a given embodiment, as will be discussed further below, various embodiments of the present invention often use only a portion of the information illustrated as part of the database 600. For example, in one embodiment, the information indicative of the general public awareness of a data item, e.g., the information illustrated in columns 632, 633 is used but not the popularity rank or information content information shown in columns 634, 636. In other embodiments, the popularity rank information is used and not the information in columns 632 and 633. In still other embodiments, the information content information is used but not the popularity or general user knowledge information. In embodiments where all the information illustrated as part of the database 600 is not used, only the portions which are used may be included in the database 600.

In still other embodiments, e.g., collaborative filter embodiments, the popularity of an item and the probability that a user knows about an item in the data base is derived from the information stored in the user database 500 thereby eliminating the need for the information database 600. For example, popularity and knowledge probability estimates may be generated based on how many users in the database 500 voted on, or indicated knowledge of, an item in the database 500.

Various features of a first method of retrieving and processing information, e.g., data included in the external databases 102, will now be discussed with reference to FIGS. 2A, 2B and 2C.

Figure 2B:
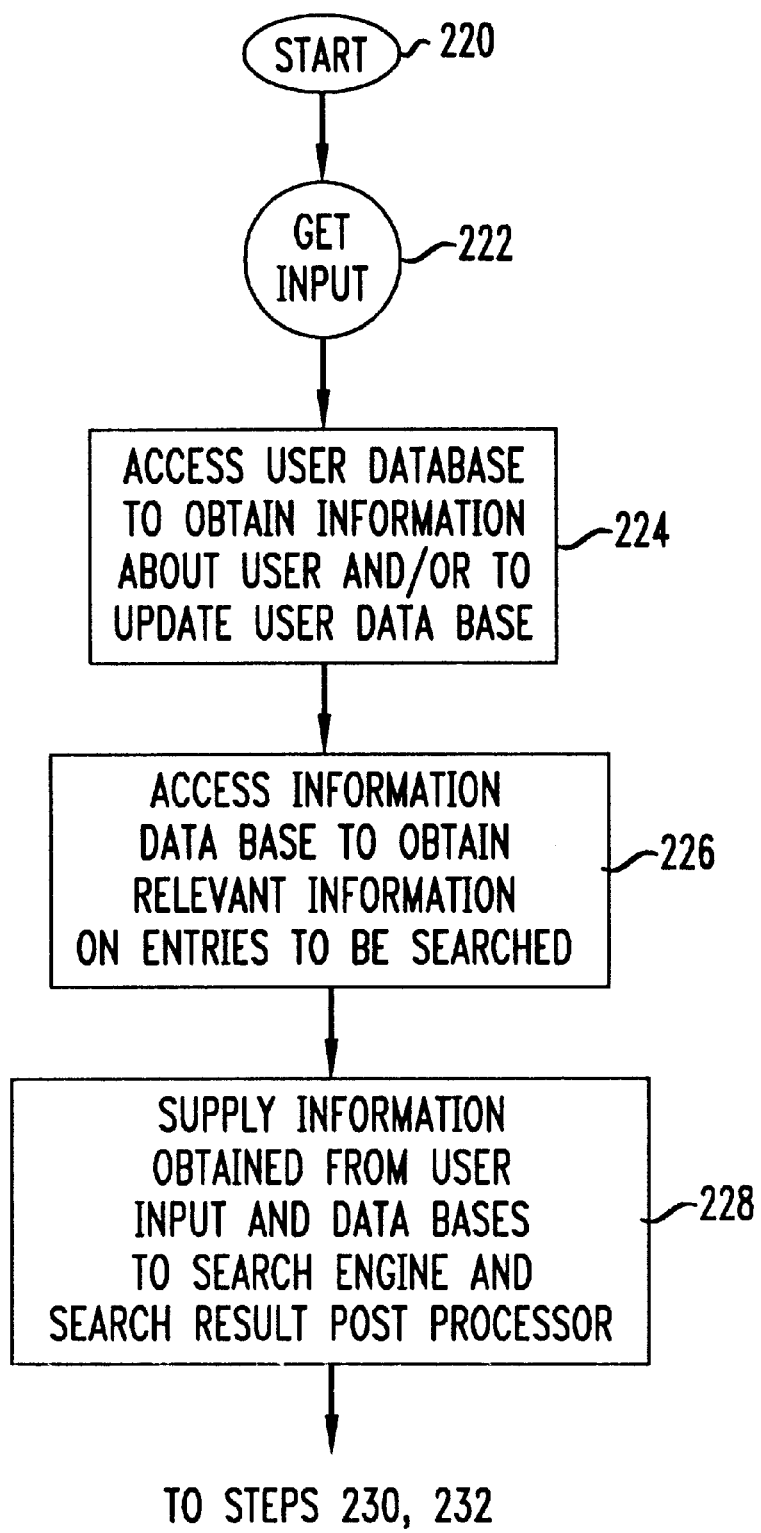
FIGS. 2B and 2C, in combination, illustrate the steps associated with a method used to implement an information retrieval system in accordance with the first exemplary embodiment of the present invention.

FIG. 2A illustrates the flow of data that results between various components of the system 100 illustrated in FIG. 1 when the system 100 is used to implement a database search and information retrieval operation in accordance with a first embodiment of the present invention. FIGS. 2B and 2C, in combination, illustrate the steps associated with the method used to implement the information retrieval system in accordance with the first exemplary embodiment of the present invention.

As will be discussed in detail below, the first embodiment of the present invention involves the conducting of what may be described as a conventional search operation using the search engine 130 and then performing a novel search result post-processing operation in accordance with the present invention. The search result post processing operation is performed using the knowledge probability estimator 132 and the retrieval result adjusting module 134 which are illustrated in FIG. 2A as part of the search result post-processor 231. In the first embodiment the knowledge probability estimator 132 is used to first estimate the probability that the user initiating the search being performed already knows about the items included in the information database being searched. This is done by, e.g., generating a knowledge probability estimate pKnow, for each item in the database being searched. The generated knowledge probability estimates are then used by the retrieval result adjusting module 134 to processes the results of the search performed by the search engine 130. As will be discussed further below in regard to a second embodiment, it is possible to limit the generation of knowledge probability estimates to data base entries which are included in a set of search results thereby avoiding the need to calculate knowledge probability estimates for all of the items included in the information database being searched.

The search result processing operation performed by the retrieval result adjusting module 134 will vary depending on 1) whether the search engine 130 performs a ranking operation or merely produces a list of unranked items as a search result and 2) whether the number of items to be output to the user as the search result are to be limited to a fixed maximum number. When the search engine 130 performs a ranking operation, operation of the retrieval result adjusting module 134 may also vary depending on whether ranking values, e.g., scores, generated by the search engine 130 are interpreted as an estimate of the ranked items' relevance or an estimate of the value to a user in reviewing a ranked item, e.g., reviewing the item's informational content.

If the search results have already been ranked by the search engine, the retrieval result adjusting module 134 will re-rank, e.g., re-score and/or re-order, the search results as a function of the estimated probability that the user already knows about each of the items included in the search results. In the illustrated embodiment, the higher the probability is, that the user already knows of an item, the lower the adjusted score and rank assigned to that item will be. If the search results output by the search engine have not already been ranked, they are ranked by the retrieval result adjusting module 134 as a function of the estimated knowledge probability estimates generated by the knowledge probability estimator 134, e.g., with the items with the lowest estimated knowledge probability receiving the highest ranking.

In addition to ranking or re-ranking the search results, the retrieval result adjusting module 134 may be used to limit the number of search results to a fixed number of items, e.g., 10, 20 or 100, if so desired. The number of entries may be specified, e.g., by the user or it may be a pre-selected maximum number. In accordance with the present invention, the elimination of items from the search results output by the search engine 130 is performed as a function of the estimated probability that the user already knows about the item being considered for elimination. Items which the estimate indicates are probably already known to the user are favored for elimination over items which are less likely to be known to the user.

Figure 2C:
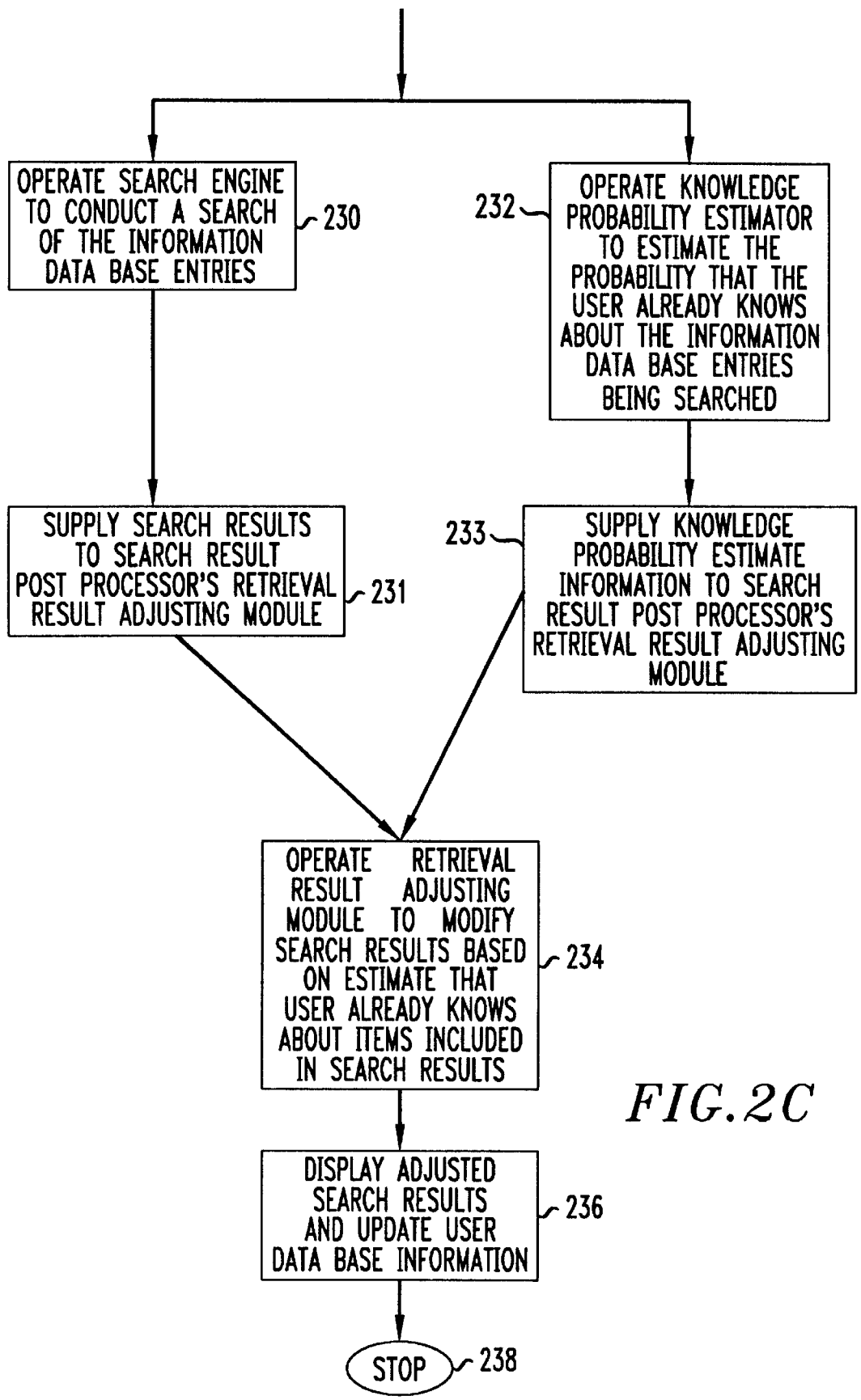

Referring now to FIGS. 2B and 2C, the method of performing an information retrieval operation in accordance with the first embodiment of the present invention will now be described. As illustrated in FIG. 2B an information retrieval operation begins in the start step 220 when the search engine 130 and other application programs including the knowledge probability estimator 132 and retrieval result adjusting module 134 are initialized in response to, e.g., an initialization signal from the user input device 170 or from another application such as the Internet browser application 131. In accordance with the present invention, the Internet browser application 131 can invoke the information retrieval process of the present invention after monitoring a user's activities, e.g. Internet site access activities over a period of time. By invoking the information retrieval process of the present invention the Internet browser 131 can conduct a search e.g., using collaborative filtering techniques. In such an embodiment, the search results represent a list of recommendations regarding additional Internet sites a user may wish to visit. If the initialization signal is from the user, as opposed to another application, it may indicate that a user of the system 100 wants to perform an information retrieval operation, e.g., database search.

After system initialization, operation progresses from step 220 to step 222. In step 222 input relating to, e.g., the search to be performed, user attributes, user preferences and/or the user's existing knowledge about items included in the information database to be searched, is obtained, e.g., via the user input device 170, or from the Internet browser application 131. For example, the Internet browser application 131 may provide information on which sites a user likes based on a user's frequent access of certain sites and information on a user's actual knowledge by keeping a list of sites previously visited by the user. Once the input required to conduct a search is obtained in step 222, operation progresses to step 224.

In step 224, the user database 104 is accessed to obtain therefrom stored information about the user's attributes, preferences, actual knowledge and/or previous searches. This information is used to supplement the information obtained in step 222. In addition to obtaining information from the user database 104, the information in the user database is updated in step 224 to reflect the most recent data obtained in step 222. The flow of data from, e.g., the user input device 170 to the user database 104 as part of the update operation performed in step 224 is represented in FIG. 2A by line 103. Line 103 leads from the user input device 170 to the user database 104. As discussed above, the information used to update the user database 104 is, in various embodiments, obtained from the Internet browser 131.

After information is obtained from the user database 104 and the database 104 has been updated with the latest user provided information, operation progresses from step 224 to step 226. In step 226, the information database 106 is accessed and relevant information on the database entries to be searched is obtained therefrom.

As illustrated in FIG. 2A, the information database includes a list of database entries, information 208 on the general level of user awareness of each entry and/or the entries historical popularity; and/or information 209 on each of the information database entries informational content.

Operation progresses from step 226 in which information is obtained from the information database 106 to step 228. In step 228, the information obtained from the user input device 170, the user database 104 and the information database 106 is supplied to the search engine 130 and the search result post-processor 231 as illustrated in FIG. 2A by lines 105 and 107.

From step 228 operation progresses to steps 230 and 232 which, in the illustrated embodiment of FIG. 2C, are performed in parallel. In step 230 the search engine is used to perform a search on the information database entries using the input obtained in step 222. The search engine produces a set of search results, e.g., a list of ranked or unranked database entries, which are supplied to the search result post-processor's retrieval result adjusting module in step 231. The passing of the search results to the retrieval result adjusting module is represented by line 131 of FIG. 2A.

As discussed above, the use of a search engine 130 which ranks the search results and generates one or more ranked lists, e.g., a list of database entries with a rank indicator associated with each of the entries is highly desirable to facilitate a user's review of retrieved information. A rank indicator, sometimes referred to as a score may be, e.g., a numerical value that is associated with each entry in the list of search results. The score can correspond to the entry's estimated, e.g., calculated, probability of relevance to a user's information retrieval request. Alternatively, the score may be an estimate of the value to the user of reviewing the entry. The use of a rank list as opposed to an unranked list is particularly useful when a user's information retrieval request is likely to result in a large number of database entries being identified and included as part of the search results.

As discussed above, one known type of search engine that is particularly well suited for use as the search engine 130 is a collaborative filter. Collaborative filters automatically prioritize information from one or more corpora of information, such as the information database 106, in response to a search request. Collaborative filters predict an individual user's interests via the analysis of a large corpus of data representing the historical behavior or interests of many different individuals and input from the user, e.g., regarding the user's preferences and knowledge about data items which are the same as, or similar to, those being searched. Collaborative filters generate a list of search results which are often recommendations regarding data items, e.g., television shows, Internet sites, music or other items or other database entries, that may be of interest to the user. The collaborative filter not only generates a list of database entries but also generates a score which is an estimate of the value to the user of reviewing each database entry and/or of an items relevance to a search request. This score, associated with each entry in the list of search results is often generated in the form of a number that is used to rank the search results. Normally, the database entries assigned the highest score will be presented to the user at the top of the list of search results.

When a collaborative filter or other type of search engine which performs a ranking operation in addition to generating a list of search results is used as the search engine 130, both the list of database entries generated in response to an information retrieval request, and the scores or numerical values used by the search engine to rank the entries in the database list are supplied to the retrieval result adjusting module 134 in step 231.

In step 232 the knowledge probability estimator 132 is used to estimate the probability that the user already knows about the various entries, e.g., television shows, that are being searched. A different knowledge probability estimate is generated for each of the information database entries. However, knowledge probabilities could be generated for groups of entries as opposed to single entries, if desired.

The knowledge probability estimates may be generated in a variety of ways taking into consideration one or more of a plurality of factors. Factors which may be used in generating the knowledge probability estimates for items being searched include, for example:

(1) the popularity of the item;
(2) a user's experience in the subject area being searched, e.g., as indicated by such variables as a user's occupation or the amount of time a user has been on the Internet;
(3) the overall salience of an item; the salience of an item can be entered by editorial staff or based on objective measures, e.g., appearance on network news, the front of a newspaper, etc. Consider, for example, that a user is more likely to already have the content of information contained in a description of a highly salient news story about a major disaster than a less salient news story about minor flooding of a single street;
(4) the amount of time an item has been accessible by the public, or on a server, e.g., the age of a news story may determine the likelihood that the information in a news story has already been seen on the server at hand or via another source;
(5) demographic information about the user, e.g., the age and sex of a user may have a bearing on the likelihood that an item is already known to a particular user with similar demographic characteristics; and
(6) other factors.

There may be probabilistic dependencies among the various factors used by the knowledge probability estimator 132.

The knowledge probability estimator 132 can be implemented in a plurality of ways. For example, given an observed set of evidenced items ($E_1, \ldots, E_n$), which may be the items or factors discussed above, the probability that a user will know about data in items can be expressed as: p(user knows information in item $I|E_1, \ldots E_n$). This probability can be calculated with explicit probabilistic models such as Bayesian networks which can capture the joint probability distribution over the states of one or more of the relevant variables listed above and the probability that a user has seen the information before. Such models can be hand crafted, solely learned from data, or a combination. For a discussion of ways to implement such models see U.S. patent application Ser. No. 08/240,019 titled "Generating Improved Belief Networks", filed on May 9, 1994, which is hereby expressly incorporated by reference.

Alternatively, parameterized functions that output an estimate of the probability that a user will have already seen information contained in an item, given values assigned to one or more of the factors discussed above can be used to implement the knowledge probability estimator 132. Such parameterized functions include, e.g., the function f(k, $E_1, \ldots E_n$)=p(user knows information in item $I| E_1, E_n$) where k is a set of one or more parameters that describes the details of the function, e.g., the slope of a line, the half-life of an exponential, or the parameters of a sigmoid. For example, the function f(k, popularity of item I)=p(user knows item I) may be used and k varied to take into consideration the effect of unmodeled variables such as the user's experience at a server. Such a parameter can also be manipulated directly by evidence about a user's experience such as the number of times a user has accessed information on a server or the duration of time since a user first accessed information from a server.

Parameterized functions which are useful for generating knowledge probability estimates include, e.g., linear functions and combinations of linear functions, exponential functions and sigmoidal functions to give a few examples.

A simple linear function that may be used can be expressed as follows: p(user knows information in item I)=pKnow=f(popularity of item in database)=fPop=kx+b. As discussed above, in the collaborative filtering embodiment fPop can be derived from the information in the user database 500. Note that b may be 0 and that by changing the value of k, the slope of the line representing the function may be altered.

By allowing a user to control the value of k as a user-controlled slider, the user can manipulate the details of the function, e.g., the slope of the line used to model the probability that the user knows about the items in the database. The use of such a slider allows the weighting of popularity to be incrementally changed by the user, e.g., changing the ordering of the information, e.g., items included in a set of search results, gracefully.

Four specific exemplary methods of generating an estimate of the probability that a user knows about an item, expressed as a value, pKnow, are as follows:

Method 1 (Exponential Method):

$$P(\text{user knows about item } I) = pKnow(I) = 1 - (1 - fPop)^{\left(\frac{a}{1-a}\right)}$$

where:
a is either a preselected or user controllable parameter that ranges in value from 0.0 to 1.0 and fPop is the ratio:

$$\frac{\text{\# of users who voted on item } (I)}{\text{Max.\# of users who voted on any item } (I)}$$

Method 2 (Logit or Sigmoid Method):

$$pKnow = \frac{t}{(1+t)},$$

where:

$$t = e^{(fPop-c)\left(\frac{d}{1-d}\right)},$$

where c and d are either preselected or user controllable parameters that range from 0.0 to 1.0 and fPop is as described above in regard to Method 1.

Method 3 (Two-Piece Linear Method):

$$pKnow = \frac{fPop * y}{x},$$

if fPop<x and $$pKnow = \frac{fPop * y}{x},$$

if fPop>=x where:
x and y are either preselected or user controllable parameters that range from 0.0 to 1.0 and fPop is as described above in regard to Method 1.

Method 4 (Rank Difference):

pKnow=a*iPopRank where:
iPopRank is the rank of the item in a general popularity list; and
a is an adjustable parameter.

Additional methods of generating knowledge probability estimates are also possible. For example, a knowledge probability estimate for a data entry may be generated as a function of the data entry's information content assuming that the user provides information on his or her relative knowledge level in different subject areas, e.g., the user's familiarity with comedy as opposed to action shows.

As discussed above, the parameters used in the above knowledge probability estimation methods can provide the user with an opportunity to influence the experience level, e.g., knowledge, the user will be assumed to possess. For example, by selecting a low value for a parameter the user can indicate little experience or knowledge of the data being searched while a higher value for the same parameter can be selected to indicate an experienced user who is already aware of, e.g., the relatively popular television shows or Internet sites in the database 106 being searched.

As an alternative to the user setting the various parameters, a preselected default value may be used or the knowledge probability estimator can automatically adjust the same parameters based on the type and number of previous searches conducted by the individual user initiating the search.

In step 233, the knowledge probability estimates (pKnow) generated for each of the data items by the knowledge probability estimator 132 in step 232, are supplied to the retrieval result adjusting module 134. Line 133 of FIG. 2A represents the passing of the probability estimates to the retrieval result adjusting module 134.

While the calculation of the knowledge probability estimates is illustrated as being performed in parallel with the operation of the search engine 130, it is to be understood that the knowledge probability estimates could be calculated prior to the performing of the database search or subsequent thereto so long as both the search results and the knowledge probability estimates are generated and supplied to the retrieval result adjusting module 134 in time to be used together.

Upon the completion of steps 231 and 233 the search result post-processor's retrieval result adjusting module 134 will have been supplied with both the search results output by the search engine 130 and the knowledge probability estimates (pKnow) output by the knowledge probability estimator 132. At this point operation progresses to step 234.

In step 234 the retrieval result adjusting module 134 is used to modify, e.g., recompute, the score previously assigned the search results by the search engine 130. This is done as a function of the knowledge probability estimates generated by the knowledge probability estimator 132. In the event that the search results were not ranked by the search engine 130, the retrieval result adjusting module 134 ranks the search results using the estimated knowledge probability values, pKnow, so that the search results which are least likely to be known to the user are located at the top of the list of previously unranked search results.

The re-scoring is performed by weighting the previous score using the probability that a user does not already know about the information in the item being re-scored and may be performed in a variety of ways depending on whether the previous score is interpreted as an estimate or measure of relevance or, instead, interpreted as an estimate or measure of the value to the user of reviewing the ranked item.

In various embodiments of the present invention, the retrieval result adjusting module 134 is used to re-score the output of the search engine 130 by taking into consideration the estimated knowledge of the user to compute as a new score, the likelihood that information in the list of search results is valuable to a user and that the information is not already known to the user. In probabilistic terms, the new scores can be computed as the product of a measure of the value or relevance of the item to the user or the search request, and a measure of the likelihood of the user not knowing about the information in the item conditioned on or given that the items in the list of search results are relevant.

Assuming that the output of the search engine 130 includes a score representing the relevance of a listed item to the user, e.g., score(I)=p(item I is relevant), the retrieval result adjusting module 134 can take into account the user's estimated knowledge and compute a new score as follows:

$$NewScore(I) = p(\text{Item } I \text{ relevant } \& \neg \text{ Knows } I) \quad \text{Equation (1)}$$
$$= p(\text{Item } I \text{ relevant}) \times$$
$$p(\neg \text{ Knows } I \mid \text{Item } I \text{ relevant})$$

where: ¬ Knows means "user doesn't know".

Thus, in accordance with Equation (1), the new score is computed as a function of the joint event of an item being relevant and the user does not previously know about the content of the item being re-scored.

The re-computing of the score can be simplified if it is assumed that the likelihood of knowing about an item is independent of the likelihood that the item is relevant. Making this assumption, Equation 1 can be rewritten as:

$$NewScore = p(\text{Item } I \text{ relevant } \& \neg \text{ Knows } I) \quad \text{Equation (2)}$$
$$= p(\text{Item } I \text{ relevant}) \times p(\neg \text{ Knows } I)$$
$$= p(\text{Item } I \text{ relevant}) [1 - p(\text{Knows } I)]$$

As discussed above, the score computed by search engine 130, e.g., a collaborative filter, may be interpreted as an estimate or measure of the value to the user of reviewing the information included in the items included in the list of search results.

In various embodiments, information on the user's actual knowledge is provided to the search engine 130. In some, but not all embodiments, this information is used by the search engine 130 to remove from the list of search results items which are already known to the user before supplying the list to the retrieval result adjusting module 134.

Assuming that the list of search results supplied to the retrieval result adjusting module 134 is limited to items that are not actually known to the user, a new score representing an estimated or expected value to the user of reviewing each item being re-scored may be calculated as follows:

$$NewScore = \text{Value reviewing}(\text{Item } I, \neg \text{ Knows } I) \times \quad \text{Equation (3)}$$
$$p(\neg \text{ Knows } I)$$
$$= \text{Value reviewing}(\text{Item } I, \neg \text{ Knows } I)[1 - p(\text{Knows } I)]$$

In using equation 3, it is assumed that the value of reviewing an item that is already know to a user is just zero. However, equation 3 can be extended and used by the retrieval result adjusting module 134 to include the notion that there is a cost to reviewing items that are already known, $$NewScore = \quad \text{Equation (4)}$$
$$\text{Value reviewing}(\text{Item } I, \neg \text{ Knows } I) \times [1 - p(\text{knows } I)] -$$
$$\text{Cost of reviewing}(\text{Item } I, \text{ Knows } I, \text{ position } I)$$
$$(p(\text{Knows } I))$$

This re-scoring approach which provides an estimate of value of reviewing an item to the user, can further be extended by considering the value and the cost of reviewing items (I) to also be a function of the items' display position, e.g., each item's position on the list of items to be displayed. That is, the score may be re-computed as follows:

$$NewScore = \quad \text{Equation (5)}$$
$$\text{Value reviewing}(\text{Item } I, \neg \text{ Knows } I, \text{ position } I) \times$$
$$[1 - p(\text{Knows } I)] - \text{Cost of reviewing}(\text{Item } I,$$
$$\text{Knows } I, \text{ position } I) (p(\text{Knows } I))]$$

The search engine 130 may output one or more lists of search results, the retrieval result adjusting module 134 can compute an estimate of the value to a use or reviewing an entire list by summing over the expected value of each item in the list. Accordingly, an over all estimate of a lists value to a user may be generated for each list output by the search engine 130 as follows:

$$NewListScore = \quad \text{Equation (6)}$$
$$\sum_{item=1}^{n} \text{Value reviewing }(\text{Item } I, \neg \text{ Knows } I, \text{ position} I) \times$$
$$[1 - p(\text{Knows } I)] - \text{Cost of reviewing }(\text{Item } I,$$
$$\text{Knows } I, \text{ position } I)[p(\text{Knows } I)]$$

The postion-dependency of the value and cost of Equations (5) and (6) can be formulated in terms of the likelihood that an item will be noticed or examined given its position. The following reformulation moves the position variable outside of the utility function as follows:

$$NewScore = \text{Value}(\text{Item } I, \neg \text{ Knows } I) \times \quad \text{Equation (7)}$$
$$p(\text{Notices } I \mid \text{position}(I), E(I, L)) \times$$
$$[1 - p(\text{Knows } I)] - \text{Cost}(\text{Item } I, \text{ Knows } I) \times$$
$$p(\text{Notices } I \mid \text{position}(I), E(I, L)) \times [p(\text{Knows } I)]$$

For a comprehensive score for a list the calculation would be as follows:

$$NewListScore = \sum_{item=1}^{n} \text{Value}(\text{Item } I, \neg \text{ Knows } I) \times \quad \text{Equation (8)}$$
$$p(\text{Notices } I \mid \text{position}(I), E(I, L)) \times$$
$$[1 - p(\text{Knows } I)] - \text{Cost}(\text{Item } I, \text{ Knows } I) \times$$
$$p(\text{Notices } I \mid \text{position}(I), E(I, L)) \times [p(\text{Knows } I)]$$

Equation (8) can be modeled by only considering the value of reviewing items and not the potential nuisance modeled by the cost if we drop the cost terms and fold in only the value components as follows:

$$NewListScore = \sum_{item=1}^{n} \text{Value}(\text{Item } I, \neg \text{ Knows } I) \times \quad \text{Equation (9)}$$
$$p(\text{Notices } I \mid \text{position}(I), E(I, L)) \times [1 - p(\text{Knows } I)]$$

The modeling of the probability: p(Notices I|position(I), E(I,L)) will now be discussed. The probability of noticing an item can be a function of several factors, including the position the item has in a list and the probability that a user will scan down to that position in the list via a process of scrolling or paging. E(I,L) is used to refer to a set of position-dependent distinctions or evidence about a list L that is being scored or rescored. Such evidence may be modeled as functions on the position and on the perceived value and costs associated with items already scanned from the initial parts of a list that have been reviewed. That is:

$$p(\text{Notices n}|\text{position (n)}, E(n,L)) = f[\text{position n}, V(\text{Item n-1}) \ldots V(\text{Item n-1}), C(\text{Item n-1}) \ldots C(\text{Item n-1})$$

where $V(\text{Item i})$ and $C(\text{Item i})$ are the value of item I as set forth in Equation (7).

In addition to considering general lists of the cost and value of items, it is possible to formulate useful higher-level distinctions on which to condition p(Notice). More sophisticated models can also be built by considering the details of the interface and decomposing the probability into a chain of conditional probabilities, e.g., to consider the probability of a user paging down and scanning the next set of items as a function of costs and benefits of the items on the previous pages. In an alternative embodiment, simpler functions to those already discussed are used to calculate the value or cost of previous items, such functions may involve the use of a threshold on the maximum value or minimum cost in the x most recent items scanned on the list, given that the user scanned down the last x items. As an example, the probability p(Notices n|position(n), E(n,L)) may be formulated as:

$$f[\text{position n}, \max[V(\text{Item n-1}), \ldots V(\text{Item n-x-1})]].$$

In such a case, the formulated probability considers only the value components of the utility of the previous x items.

For purposes of further simplification, E(I,L) may be dropped from consideration. In such a case, it is assumed that p(Notice I|position(I)) is some function of the position, e.g., some monotonically decreasing function that decreases as the depth in the list increases. Such a simplification provides:

$$p(\text{Notices n}|\text{position(n)}, E(n,L)) = f[\text{position n}] \text{ where the}$$

likely dependency of the probability of the length of the list on the quality of the list is not considered.

Having discussed the re-scoring and probability calculations that may be performed by the retrieval result adjusting module of the present invention, various particular embodiments will now be discussed. In one particular embodiment, when the retrieval result adjusting module is used with a knowledge probability estimator 132 that performs any of the first three particular exemplary knowledge estimation techniques discussed above, i.e., Method 1 , Method 2 , or Method 3 , the ranking in the list of search results represented by a value, rOldScore, is adjusted as follows:

$$rNewScore = rOldScore * (1 - pKnow)$$

where:
rNewScore is the ranking value or score used to rank the item in the list of search results that is being re-ranked;
* represents a multiply operation;
rOldScore is the ranking value or score generated and output by the search engine 130 that is associated with the item in the list of search results that is being re-ranked; and
pKnow is the value generated by the knowledge probability estimator 132 which represents the likelihood that the user is already aware of the item in the list of search results that is being re-ranked.

When the retrieval result adjusting module is used with a knowledge probability estimator 132 that performs the fourth knowledge estimation technique (Method 4) discussed above, in one particular embodiment, the ranking of each individual item in the list of search results is adjusted using the following formula:

$$rNewRank = iOldRank - iPopRank$$

where:
rNewRank represents the ranking value or score used to rank the item in the list of search results that is being re-ranked;
iOldRank represents the rank value or score output by the search engine 130 for the particular data item in the list of search results that is being re-ranked; and
PopRank is the rank of the item in a general popularity list.

By processing the search results in the above described manner, the search results are adjusted to take into consideration a user's estimated knowledge and search results which are probably already known to the user are much less likely to be presented at the top of a list of search results. In addition, when the search results are limited to a fixed number of items which are probably already known to a user, the elimination of items from the list of search results which are probably already known to the user will be favored over items which are less likely to be known to the user. Accordingly, the methods and apparatus of the present invention are less likely to burden a user with information which is already known to the user then are known information retrieval systems.

Once the retrieval result adjusting module 134 has completed the modification of the search results, e.g., to take into account the user's estimated knowledge, the adjusted results are displayed in step 236 so that the user can review them. In addition, the previous search information stored in the user database is updated to reflect the user's most recent search. The previous search information may include information on the entries which were presented to the user as a result of the search. In some embodiments, it may be assumed by the knowledge probability estimator 132 that the user is aware of these entries, or at least the highest ranked entries, in future searches. In FIG. 2A, the supplying of the output of the retrieval result adjusting module 134, e.g., the list of adjusted, ranked or re-ranked search results, to the display device 150 and the user database in step 236 is represented by line 149.

After the search results are displayed and the user database 104 updated in step 236 operation halts in step 238 awaiting further user input, e.g., initiating another information retrieval operation.

Alternative embodiments of the present invention will now be discussed with reference to FIGS. 3A, 3B, 3C and FIGS. 4A, 4B, 4C. Many of the steps and elements of these alternative embodiments of the present invention are the same as or similar to the previously described steps of FIGS. 2A, 2B and 2C. The same or similar steps and elements are labeled in the various figures using the same references numbers as used in FIGS. 2A, 2B and 2C to avoid confusion. Previously described elements and steps of FIGS. 3A, 3B, 3C and 4A, 4B, 4C will not be described again in detail for the purposes of brevity.

Figure 3A:
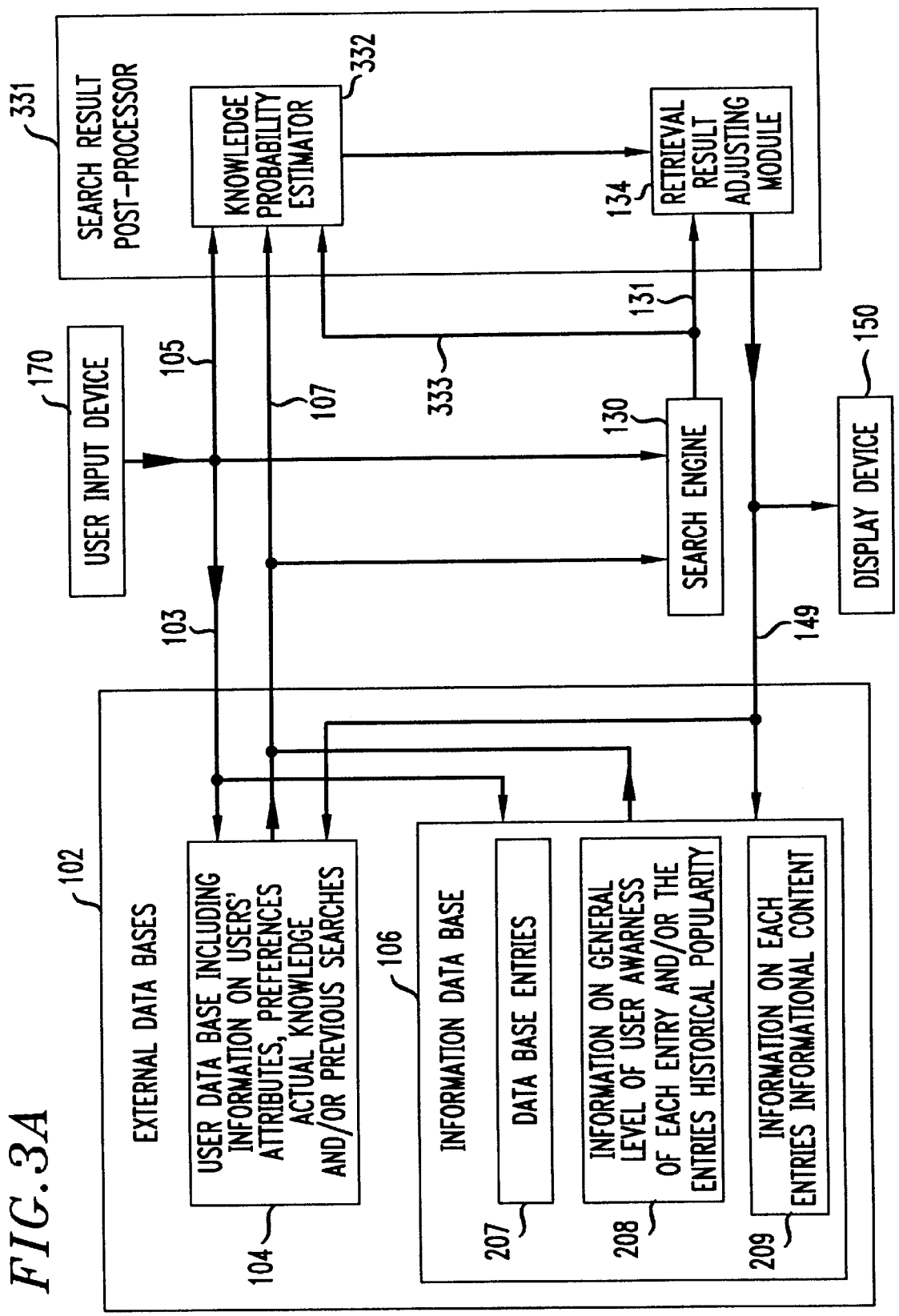
FIGS. 3A illustrates the data flow between various components of the information retrieval system of FIG. 1 when the system of FIG. 1 is configured in accordance with a second exemplary embodiment of the present invention.
Figure 3B:
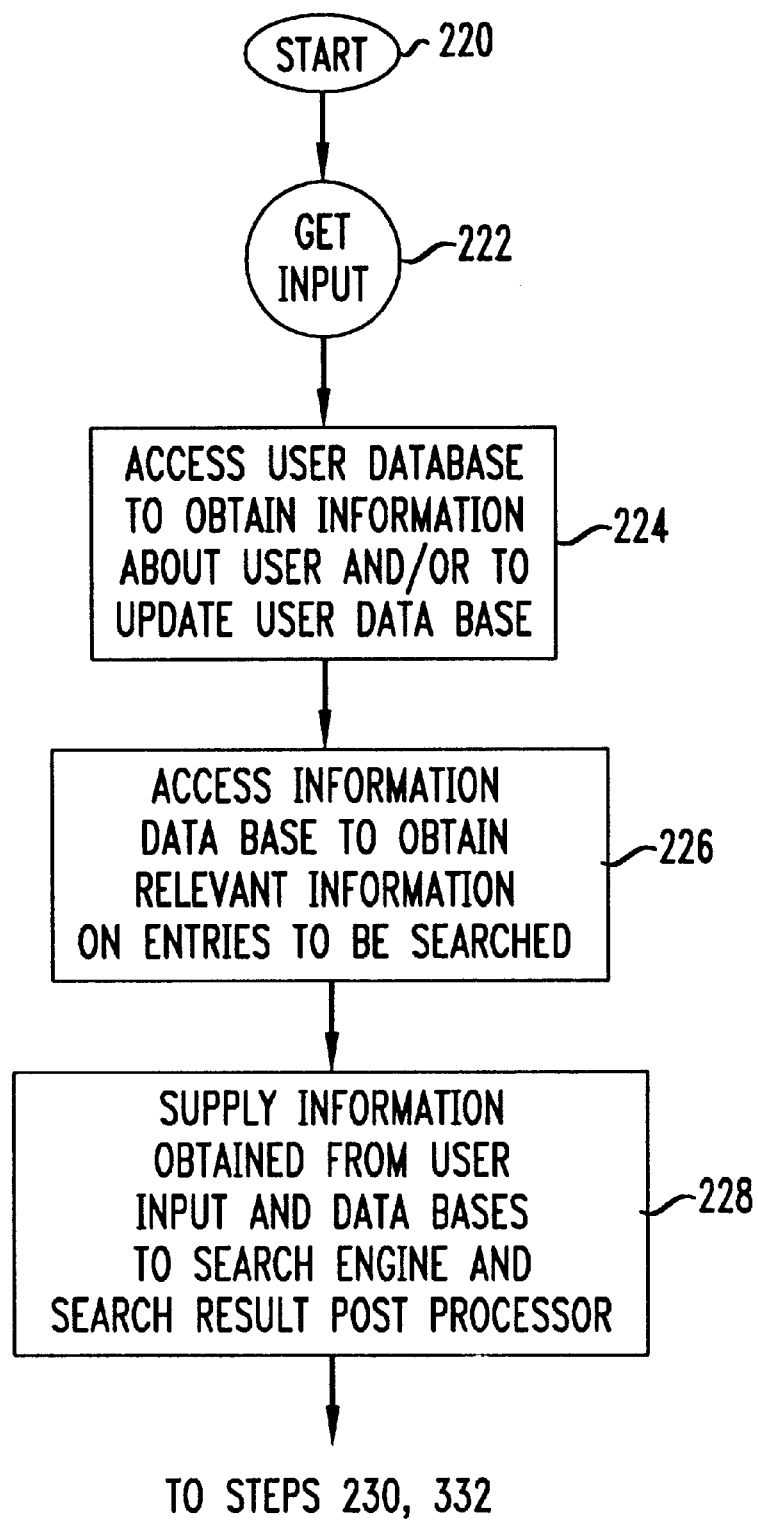
FIGS. 3B and 3C, in combination, illustrate the steps associated with a method used to implement an information retrieval system in accordance with the second exemplary embodiment of the present invention.
Figure 3C:
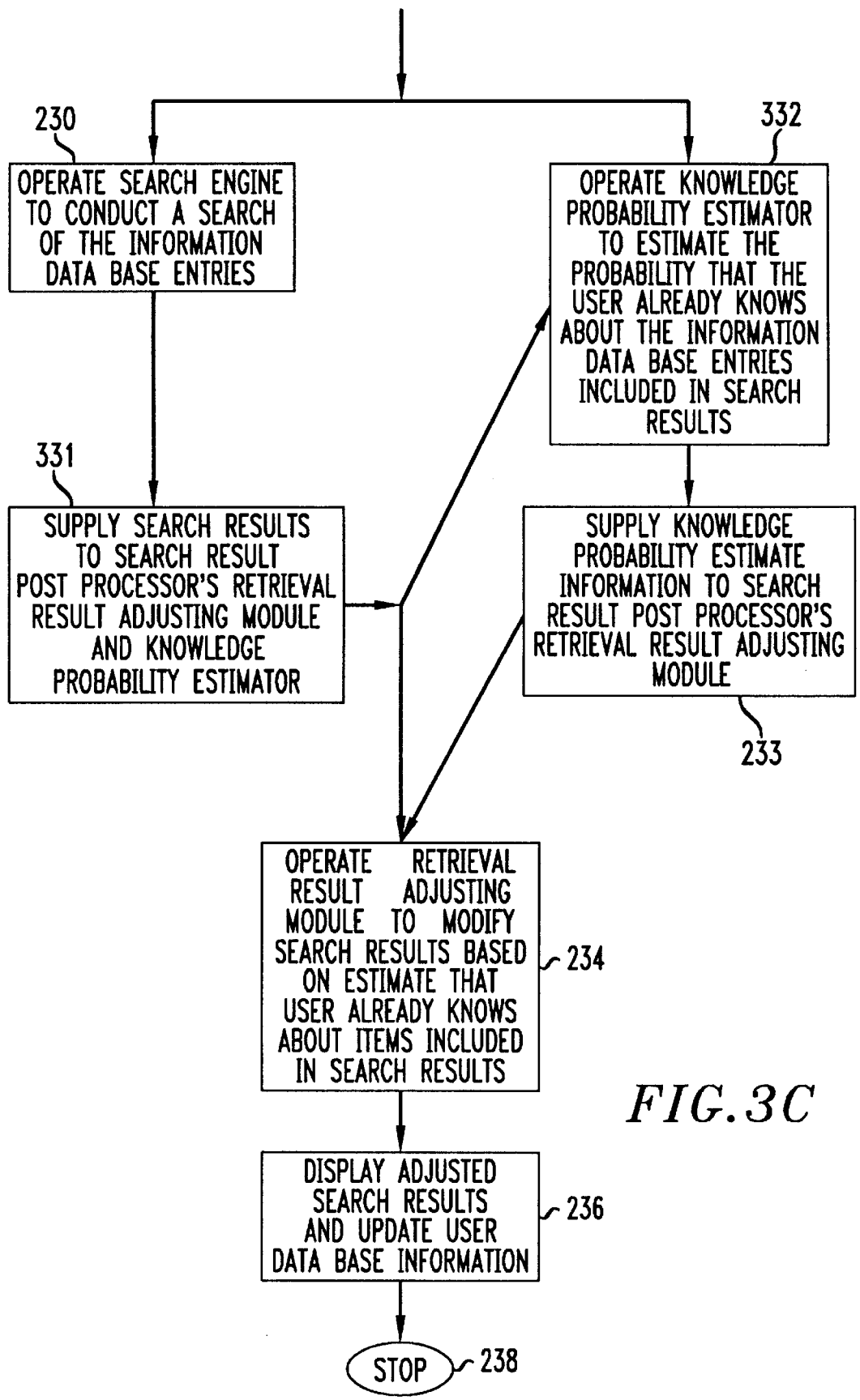

FIGS. 3A, 3B and 3C illustrate an embodiment of the present invention wherein knowledge probability estimates are generated only for data items included in the list of search results generated by the search engine 130. That is, knowledge probability estimates are not generated for entries in the information database 106 that are not included in the search results. This approach generally requires fewer knowledge probability estimates to be made than the FIG. 2A embodiment.

In order to implement the embodiment illustrated in FIGS. 3A, 3B and 3C, in step 331 of FIG. 3C the search results are supplied to the knowledge probability estimator 332 in addition to the retrieval result adjusting module 134. This operation is represented in FIG. 3A by lines 333 and 131 in FIG. 3A. In addition, steps 331 and 332, illustrated in FIG. 3C, replace steps 231 and 232 of the FIG. 2B embodiment. Step 331 involves the supplying of the search results to the knowledge probability estimator 332 in addition to the retrieval result adjusting module 134. Meanwhile, step 332 involves the step of generating knowledge probability estimates for the database entries included in the search results as opposed to all the database entries.

Because the FIGS. 3A, 3B, 3C embodiment involves generating knowledge probability estimates only for the data items included in the list of search results, the amount of processing resources required to implement the knowledge probability estimator 332 is generally less than that required to implement the knowledge probability estimator 132 of the FIG. 2A embodiment even though the knowledge probability estimates may be generated using the same techniques in both embodiments.

Figure 4A:
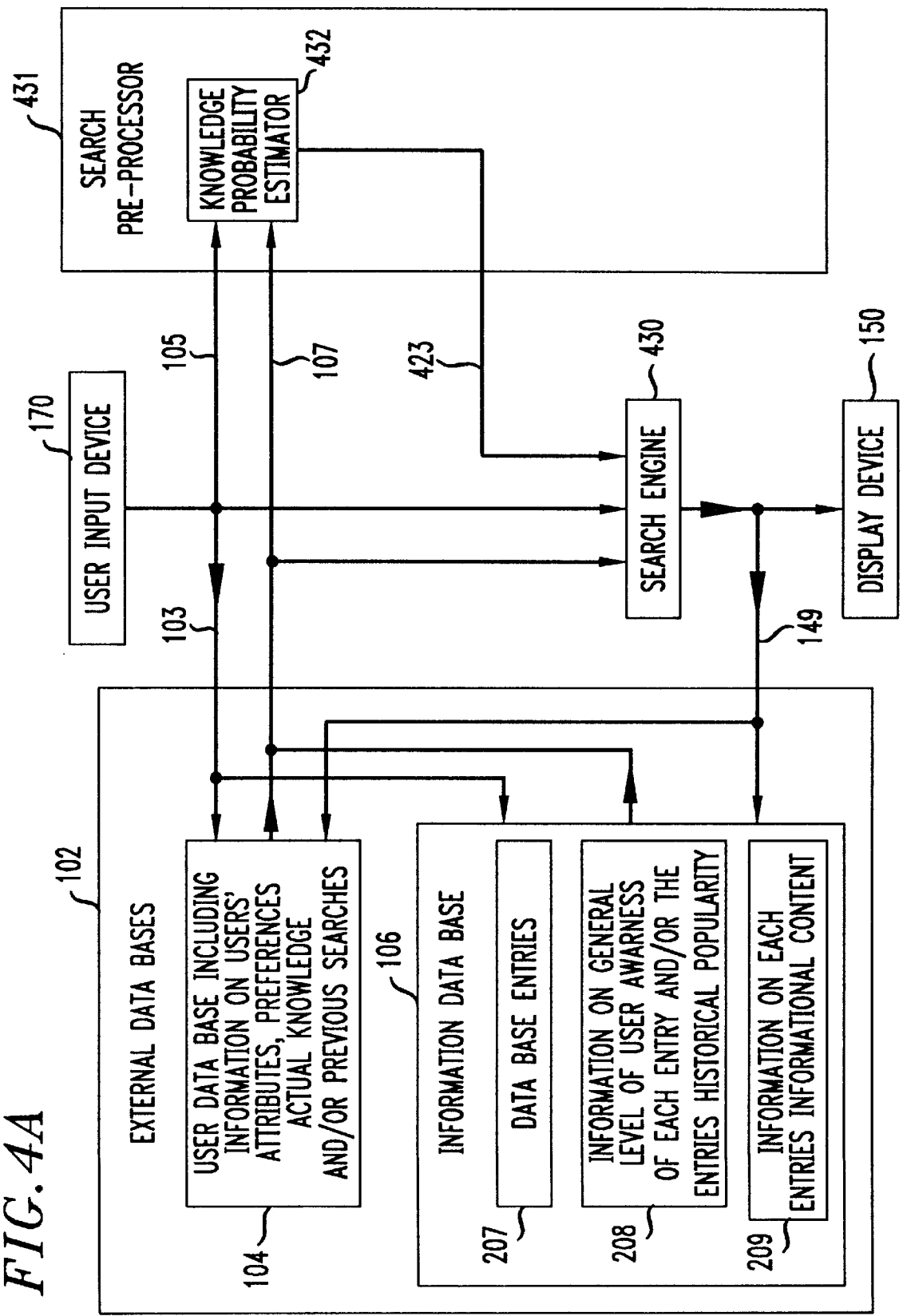
FIG. 4A illustrates the data flow between various components of the information retrieval system of FIG. 1 when the system of FIG. 1 is configured in accordance with a third exemplary embodiment of the present invention.
Figure 4B:
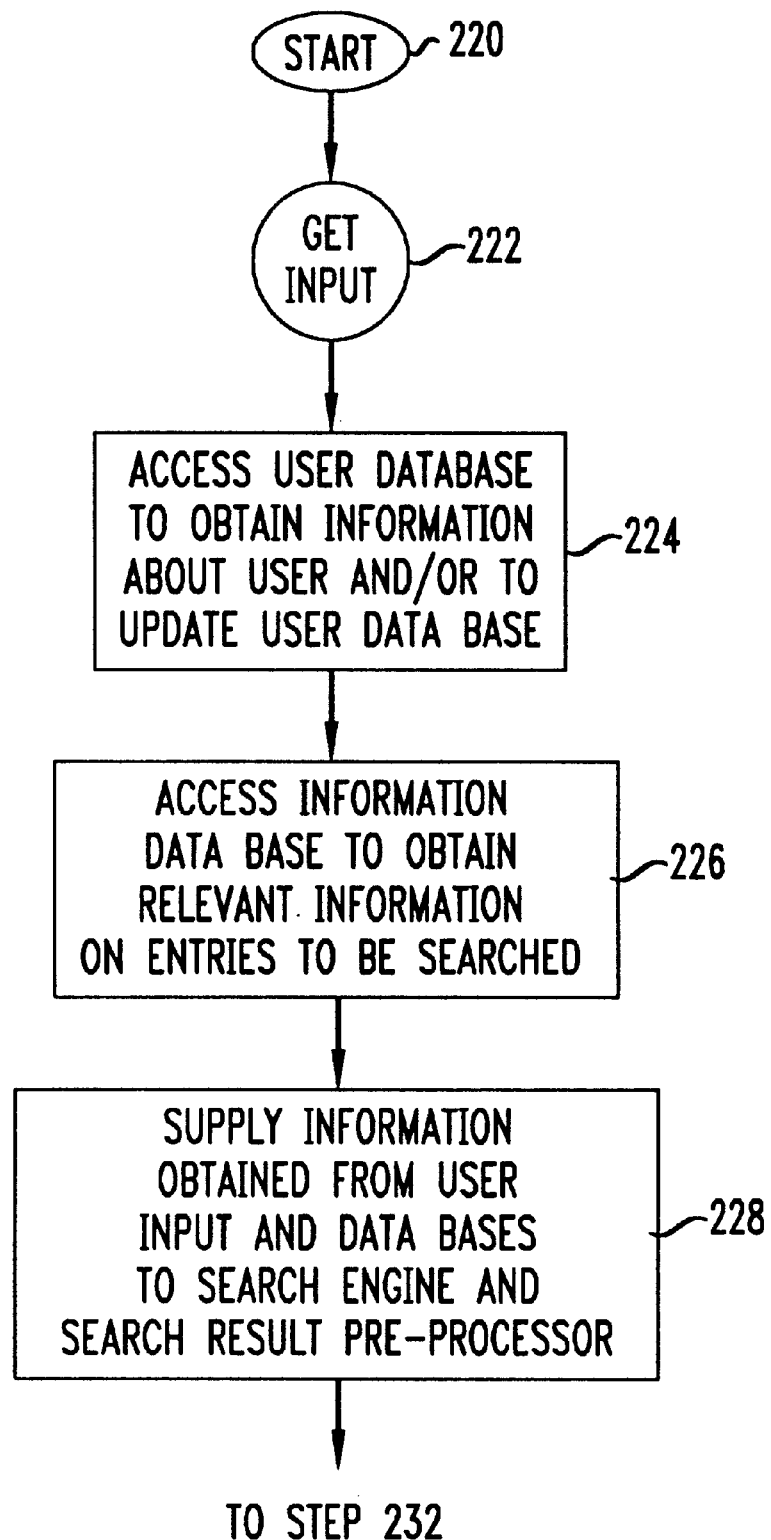
FIGS. 4B and 4C, in combination, illustrate the steps associated with a method used to implement an information retrieval system in accordance with the third exemplary embodiment of the present invention.
Figure 4C:
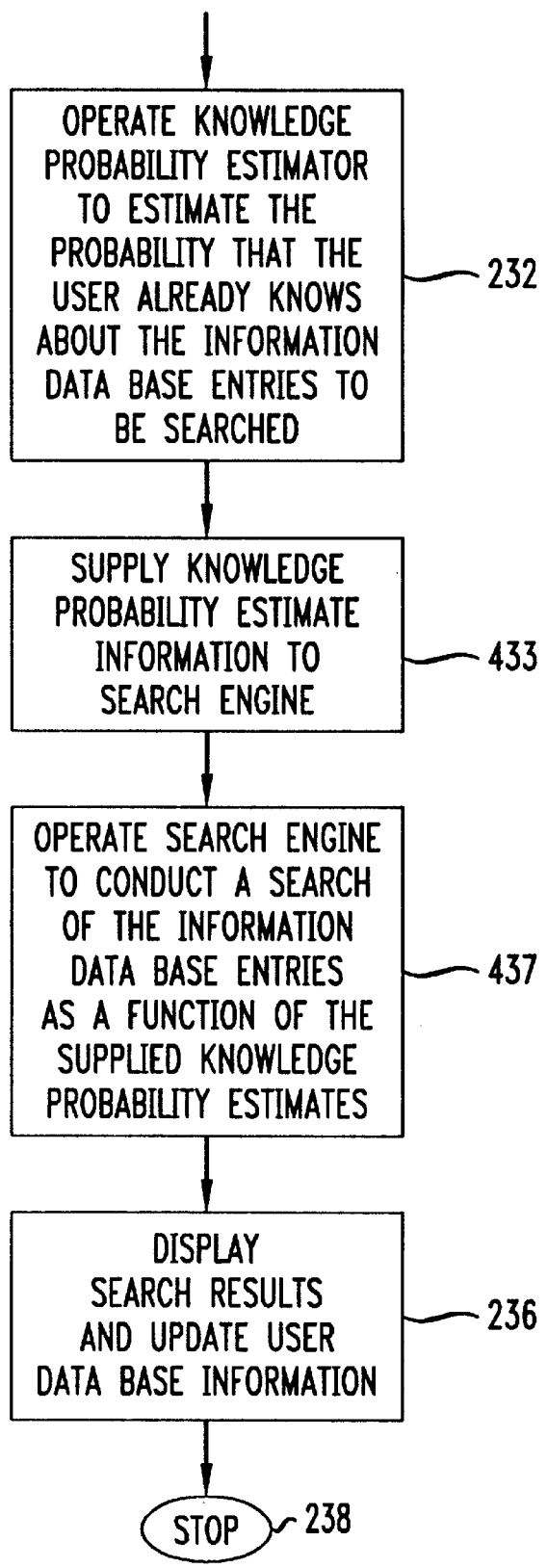

FIGS. 4A, 4B and 4C illustrate yet another embodiment (the FIG. 4 embodiment) of the present invention. In the FIG. 4 embodiment, a knowledge probability estimator 432 and an retrieval result adjusting module 434 are incorporated into a search pre-processor 431. This is in contrast to the embodiments of the earlier figures which incorporate similar elements into a search result post-processor. In the FIG. 4 embodiment and as illustrated in FIG. 4C, the knowledge probability estimates are generated prior to the search, e.g., in step 232 and then supplied in step 433 to the search engine 430. This operation is represented by line 423 of FIG. 4A. After the knowledge probability estimates are supplied to the search engine 430 the search engine conducts a database search and then generates a ranked list of search results as a function of the supplied knowledge probability estimates. Operation then progresses to step 236 and the search results are displayed.

Thus, in accordance with the FIG. 4 embodiment, knowledge estimation is performed prior to the search and the generated estimates of user knowledge are used by the search engine 430 to generate the search results.

In view of the above discussion it will clear that the knowledge estimation methods of the present invention can also be directly incorporated into a search engine thereby avoiding the use of separate modules to perform the various functions and operations described herein.

While the present invention has been described above with regard to database searches relating to television shows and Internet sites, it is to be appreciated that the methods and apparatus of the present invention can be applied to a wide range of database information retrieval and recommendation making applications. Such application may be based on using a search engine such as, e.g., a collaborative filter, to process data in a database. For example, the present invention can be used to select data from a database to be included in a personalized electronic newspaper and it can be applied to various Internet applications relating to information retrieval as well as recommending Internet sites to visit. In addition the present invention can be used to make recommendations regarding graphical layouts, to find an email alias or to make a suggestion for an email alias to use. Features of the present invention can be applied to many other areas as well including the retrieving of information relating to music, movies, wines, restaurants and real estate.

Accordingly, it is to be understood that the present invention is not limited to the various embodiments set forth above for illustrative purposes, but also encompasses various modifications which are rendered obvious by the present disclosure.

What is claimed is:

1. A method of retrieving information for a user, the method, comprising the steps of:

generating a set of search results including a plurality of entries, at least some of said entries not being known to the user; and arranging the set of search results for presentation to the user from top to bottom, using estimates of the probability that the entries are known to the user, the step of arranging being performed so that entries having a higher probability of being known to the user are less likely to be placed at the top of the arranged set of search results then entries which have a lower probability of being known to the user.

2. The method of claim 1, further comprising the step of:

generating, for each entry in the set of search results, an estimate of the probability that the particular entry, for which the estimate is being generated, is known to the user.

3. The method of claim 2, wherein the step of generating an estimate that the particular entry is known to the user is performed as a function of a user controlled parameter indicative of the knowledge level of the user.

4. The method of claim 2, wherein the step of generating an estimate that the particular entry is known to the user is performed as a function of popularity information relating the particular entry.

5. The method of claim 4, wherein the step of generating an estimate that the particular entry is known to the user is also performed as a function of a user controlled parameter indicative of the knowledge level of the user.

6. The method of claim 2, wherein the step of generating an estimate that the particular entry is known to the user is performed as a function of the salience of information associated with each particular entry.

7. The method of claim 2, wherein the step of generating an estimate that the particular entry is known to the user is performed as a function of user demographic information.

8. The method of claim 2, wherein the step of generating an estimate that the particular entry is known to the user is performed as a function of the amount of time an item has been accessible to the public.

9. The method of claim 2, wherein the step of generating an estimate that the particular entry is known to the user is performed as a function of an information content associated with each particular entry.

10. The method of claim 2, wherein the step of generating an estimate that a particular entry is known to the user is performed as a function of the particular entry's rank in a popularity list.

11. The method of claim 1, wherein the step of generating a set of search results includes the step of:

ranking the entries included in the set of search results by generating for, and associating with, each one of the entries a rank indicator, pRank, having a numerical value indicating the entry's rank in the set of search results; and wherein the step of arranging the set of search results includes the step of:

altering the value of a plurality of the rank indicators as a function of the estimate that the entries in the set of search results is known to the user.

12. The method of claim 11, wherein the step of estimating the probability that the entries in the set of search results are known to the user includes the step of:

generating, for each entry in the set of search results, an estimate represented as a value, pKnow, that the particular entry for which the estimate is being generated, is known to the user.

13. The method of claim 1, wherein the step of generating the set of search results further includes the step of:

generating, for each individual entry in the set of search results, a score indicative of the relevance of the individual entry;

the method further comprising the steps of:

generating a knowledge probability estimate, corresponding to each individual entry included in the set of search results, the knowledge probability estimate representing an estimate of the probability that information included in the corresponding entry is not known to the user; and ranking the entries, in the set of search results, as a function of new scores generated for the entries in the set of search results, a new score being generated for each entry as the product of the entry's previously generated knowledge probability estimate and score.

14. The method of claim 13, wherein the knowledge probability estimate corresponding to each individual entry is generated as a function of an estimate that the user knows about the information included in the corresponding entry.

15. The method of claim 1, wherein the step of generating the set of search results further includes the step of:

generating, for each individual entry in the set of search results, a score indicative of the relevance of the individual entry;

the method further comprising the steps of:

generating a knowledge probability estimate, corresponding to each individual entry included in the set of search results, the knowledge probability estimate representing a measure of the likelihood that information including in the corresponding entry is not known to the user; and ranking the entries, in the set of search results, as a function of new scores generated for the entries in the set of search results, a new score being generated for each entry as the product of the entry's previously generated knowledge probability estimate and score.

16. The method of claim 15, wherein the knowledge probability estimate corresponding to each individual entry is generated as a function of an estimate that the user knows about the information included in the corresponding entry.

17. The method of claim 1, further comprising the steps of:

generating value estimates representing estimates of the value to the user of reviewing individual items included in the set of search results;

generating knowledge probability estimates representing estimates of the probability that the user does not know about individual items in the set of search results; and wherein the step of arranging the set of search results is performed as a function of the generated value estimates and generated knowledge probability estimates.

18. The method of claim 17, further comprising the step of:

generating cost estimates representing estimates of the cost to the user associated with reviewing an item in the set of search results.

19. The method of claim 18, wherein the step of arranging the set of search results is also performed as a function of the generated cost estimates.

20. The method of claim 19, further comprising the step of:

calculating a comprehensive value representing an estimate of the value of reviewing an entire set of search results as a function of the estimated value of reviewing individual items included in the set of search results.

21. The method of claim 20, wherein the comprehensive value is computed as a function of the sum of the estimated value of reviewing individual items included in the set of search results.

22. A computer-readable medium having computer-executable instructions for performing the steps recited in claim 1.

23. The method of claim 1, wherein the step of arranging the set of search results includes the step of:

assigning a lower rank to a first entry having a higher probability of being known to the user than to a second entry having a lower probability of being known to the user.

24. The method of claim 1, wherein the entries are not known to have been reviewed by the user, the method further comprising the step of:

eliminating from the set of search results the entry having the highest estimated probability of being known to the user.

25. The method of claim 1, wherein the step of arranging the set of search results includes the step of generating scores used for ranking the entries, the score being generated as a product of a plurality of factors, one factor being a function of the estimated probability of an entry being known to the user, said factor being smaller for entries having a higher probability of being known to a user than for entries having a lower probability of being known to a user.

26. An information retrieval system comprising:

a user input device for receiving database search requests from a user;

a database including a plurality of entries;

means for generating knowledge probability estimates representing the probability that individual database entries are known to the user; and a search engine coupled to the user input device, the database, and the means for generating knowledge probability estimates, the search engine including means for ranking the search results as a function of the generated knowledge probability estimates, a database entry included in the search results having a first probability of being known to the user being weighted in favor of receiving a higher ranking than database entrees having a probability of being known to the user which is greater than the first probability;

eliminating from the set of search results the entry having the highest estimated probability of being known to the user.

27. A processing apparatus for processing ranked search results, comprising:

a knowledge probability estimator for estimating the probability that one or more entries included in the database being searched are known to the user; and a search result adjuster coupled to the knowledge probability estimator for re-ordering the search results as a function of the estimated probability that one or more entries included in the search results are known to the user, the search result adjuster including means for re-ranking the search results to reflect a diminution in the relative rank of search results which are estimated to already be known to the user.

28. A method of retrieving information for a user, the method, comprising the steps of:

generating a set of search results including a plurality of entries, at least some of said entries not being known to the user, the step of generating the set of search results including the step of ranking the entries in the set of search results; and arranging the set of search results for presentation to the user from top to bottom, using estimates of the probability that the entries are known to the user, the step of arranging the set of search results, including the step of:

adjusting the ranking of the entries in the set of search results, the rank of each particular entry being adjusted as a function of the ranking of the particular entry and the estimated probability that the particular entry is known to the user.

29. The method of claim 28, wherein the step of generating a set of search results includes the step of:

performing a collaborative filtering operation using stored historical information and information about the preferences and attributes of the user.

30. The method of claim 29, wherein the step of estimating the probability that the entries in the set of search results are known to the user includes the use of at least a portion of the stored historical information.

31. The method of claim 28, further comprising the step of:

monitoring the user's actions for a period of time; and wherein the step of generating a set of search results further includes the step of conduction a search as a function of the user's monitored actions.

32. The method of claim 28, wherein the step of generating a set of search results includes:

the step of conducting a search of a database in response to an information retrieval request from the user.

33. The method of claim 32, wherein the step of generating, for each entry in the set of search results, an estimate that the particular entry for which the estimate is being generated is known to the user, is performed prior to the step of generating the set of search results by generating an estimate for each entry in the database being searched.

34. The method of claim 28, wherein the step of generating a set of search results further comprises the step of:

accessing a database including information on Internet sites.

35. The method of claim 28, wherein the step of generating a set of search results further comprises the step of:

accessing a database including information on television shows.

36. The method of claim 28, wherein the step of generating a set of search results further comprises the step of:

accessing a database including information on music.

37. A processing apparatus for re-ordering a set of information items ordered for presentation to a user, the set of information items including at least one information item not known to the user, the apparatus comprising:

a knowledge probability estimator for estimating the probability that one or more entries included in the set of information items are known to the user; and an order adjusting device for re-ordering the search results as a function of the estimated probability that one or more entries included in the database being searched are known to the user to decrease the probability that information items already known to the user will be located at the top of the ordered set of information items.

38. The processing apparatus of claim 37, wherein the knowledge probability estimator includes means for receiving a plurality of factors used for estimating said probability.

39. The processing apparatus of claim 38, wherein one of said plurality of factors is the age of entries included in the search results and another of said plurality of factors is the popularity of entries included in the search results.

40. An information retrieval system for searching a database including a plurality of entries, the system comprising:

a search engine coupled to the database;

a knowledge probability estimator coupled to the search engine for estimating the probability that entries in the database are known to a user of the information retrieval system; and a retrieval result adjusting module coupled to the search engine for receiving therefrom search results including database entries and for ranking the received search results as a function of the estimated probability that the entries included in the search results are known to the user, the retrieval result adjusting module favoring for a higher ranking for database entries which are less likely to be known to the user than entries which are more likely to be known to a user.

41. The apparatus of claim 40, further comprising:

means for presenting the ranked search results to the user.

42. The apparatus of claim 41, further comprising:

a user input device coupled to the knowledge probability estimator for supplying thereto user input indicative of the knowledge level of the user.

43. The apparatus of claim 42, wherein the search engine is a collaborative filter;

wherein the database includes information on the popularity of entries in the database; and the apparatus further includes means for supplying the popularity information included in the database to both the knowledge probability estimator and the collaborative filter.

44. The apparatus of claim 43, further comprising:

a user database coupled to the collaborative filter and to the knowledge probability estimator, the user database including information on user attributes and preferences.

45. The apparatus of claim 44, further comprising:

means for coupling the database to the search engine via the Internet.

46. The apparatus of claim 40, wherein the search engine is of a type which ranks the search results according to a first preselected ranking scheme; and wherein the ranking performed by the retrieval result adjusting module results in modifications to the ranking of the search results previously ranked according to the first preselected ranking scheme.

47. The apparatus of claim 46, wherein the search engine is a collaborative filter.

* * * * *